US012536435B2

(12) United States Patent
Kakishita et al.

(10) Patent No.: US 12,536,435 B2
(45) Date of Patent: Jan. 27, 2026

(54) COMPUTING MACHINE, LEARNING METHOD OF CLASSIFIER, AND ANALYSIS SYSTEM

(71) Applicant: Hitachi High-Tech Corporation, Tokyo (JP)

(72) Inventors: Yasuki Kakishita, Tokyo (JP); Hideharu Hattori, Tokyo (JP); Yoichiro Suzuki, Tokyo (JP); Hidetsugu Tanoue, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 801 days.

(21) Appl. No.: 17/795,291

(22) PCT Filed: Jan. 18, 2021

(86) PCT No.: PCT/JP2021/001513
§ 371 (c)(1),
(2) Date: Jul. 26, 2022

(87) PCT Pub. No.: WO2021/157330
PCT Pub. Date: Aug. 12, 2021

(65) Prior Publication Data
US 2023/0072040 A1 Mar. 9, 2023

(30) Foreign Application Priority Data
Feb. 6, 2020 (JP) .................. 2020-018575

(51) Int. Cl.
*G06N 3/08* (2023.01)
(52) U.S. Cl.
CPC ...................... *G06N 3/08* (2013.01)

(58) Field of Classification Search
USPC ........................................ 706/12
See application file for complete search history.

(56) References Cited

U.S. PATENT DOCUMENTS

| 6,092,017 | A | 7/2000 | Ishida et al. |
| 10,552,712 | B2 * | 2/2020 | Shen ............ G06V 40/171 |

(Continued)

FOREIGN PATENT DOCUMENTS

| JP | H11-85719 A | 3/1999 |
| JP | 2017-138808 A | 8/2017 |
| JP | 2019-027927 A | 2/2019 |

OTHER PUBLICATIONS

Zhang, Q., et al. "Improving Brain computer interface performance by data augmentation with conditional Deep Convolutional Generative Adversarial Networks", (2018).

(Continued)

*Primary Examiner* — April Y Blair
(74) *Attorney, Agent, or Firm* — Volpe Koenig

(57) ABSTRACT

A computing machine includes: a storage unit that stores learning data; a learning unit that executes learning processing for generating a classifier by using the learning data; and a generation unit that generates the learning data, and the generation unit calculates a feature amount vector handled by the classifier by using the learning data stored in the storage unit, analyzes the distribution ox the learning data in a feature amount space on the basis of the feature amount vector to specify a boundary where the classification result of the classifier changes in the feature amount space, and generates new learning data by using the learning data existing in the vicinity of the boundary.

8 Claims, 8 Drawing Sheets

(56) References Cited

U.S. PATENT DOCUMENTS

| | | | |
|---|---|---|---|
| 2019/0087384 A1* | 3/2019 | Goto | G06N 20/00 |
| 2020/0012898 A1* | 1/2020 | Zhao | G06F 18/22 |
| 2020/0090036 A1* | 3/2020 | Nakata | G06N 3/045 |
| 2020/0242752 A1 | 7/2020 | Kakishita et al. | |

OTHER PUBLICATIONS

Extended European Search Report issued on Feb. 7, 2024 for European Patent Application No. 21751391.0.

Chinese Office Action issued on Feb. 8, 2025 for Chinese Patent Application No. 202180008949.4.

Elreedy, D., et al., "A Comprehensive Analysis of Synthetic Minority Oversampling Technique (SMOTE) for handling class imbalance," Information Sciences, vol. 505, (2019).

International Search Report, PCT/JP2021/001513, Apr. 6, 2021, 2 pgs.

\* cited by examiner

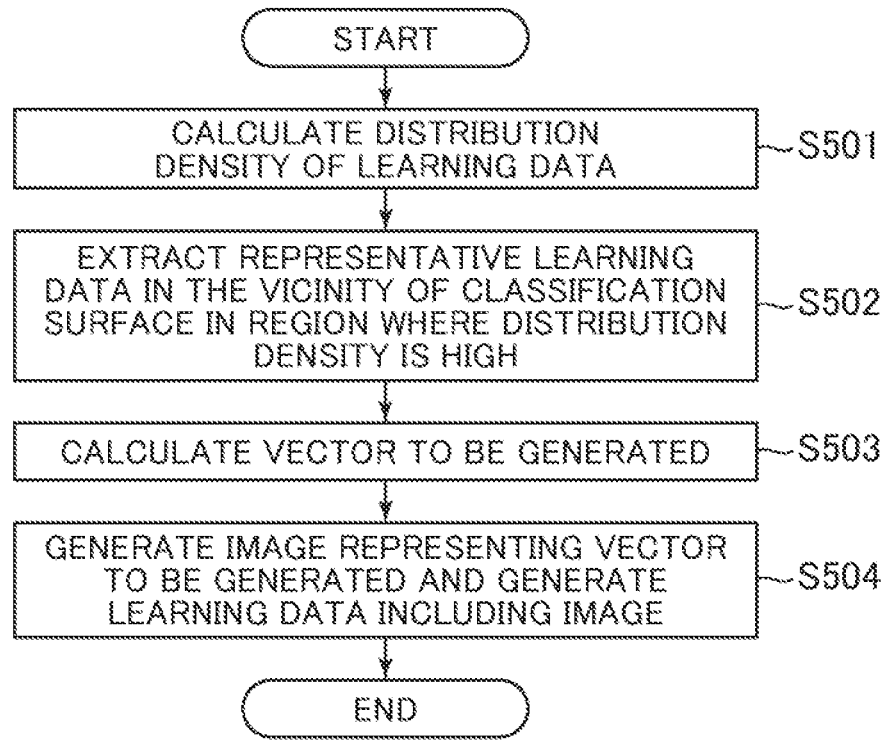
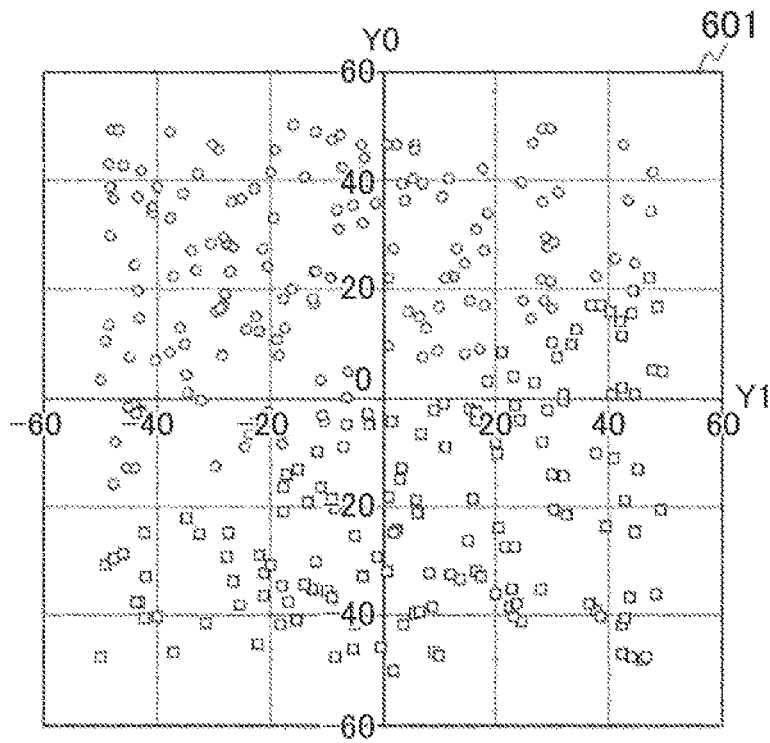

COMPUTING MACHINE, LEARNING METHOD OF CLASSIFIER, AND ANALYSIS SYSTEM

INCORPORATION BY REFERENCE

This application claims the priority of Japanese Patent Application No. 2020-18575, filed on Feb. 6, 2020, and the content thereof is incorporated herein by reference.

TECHNICAL FIELD

The present invention relates to a generation technique of a classifier for classifying an arbitrary event.

BACKGROUND ART

In order to analyze the components or the like of a sample such as blood and urine, an automatic analysis system including an immunoanalysis device or the like measures the states of color development and light emission generated from a reaction solution obtained by reacting the sample with a reagent. The sample, the reagent, the reaction solution, and the like used for analysis are contained in a container such as a test tube, and are collected from the container by a collection unit such as a dispensing probe.

In the case where bubbles are present on a liquid surface when the sample or reagent is collected, the dispensing probe erroneously detects the bubbles as the liquid surface, so that there is a problem that the amount of sample or reagent required for analysis cannot be sucked. In order to solve this problem, the technique described in Patent Literature 1 has been known.

Patent Literature 1 describes "a device that determines the state of a sample to be analyzed contained in a container acquires an image of the sample, analyzes the position and size of a target to be detected relative to a detection range set in the image by using the image of the sample, and determines the state of the sample on the basis of on the result of the analysis."

In recent years, products equipped with a classifier generated by executing machine learning are beginning to appear on the market. The classifier is generated by machine learning using a set of learning data (learning data set) configured using input data (input signal) and teacher data (teacher signal) input to the classifier.

A classifier (model) such as a neural network is complicated in structure, and it is difficult, for humans to understand the behavior. Therefore, in order to respond to erroneous classification occurring in the real field, new containers and samples, or customization and tuning for each facility, a method of constructing a new learning data set, executing machine learning again, and regenerating a classifier is general. This is referred to as re-learning in the specification.

By performing the re-learning, it is expected to improve the classification accuracy for input data, which has not been able to cope with so far. However, since the characteristics of the classifier are changed as a result of performing the re-learning, there is a possibility of outputting an erroneous classification result to the input data correctly recognized before the re-learning. In particular, in the case where the classifier is evaluated using evaluation data including input data and teacher data and strictly defined to be mounted in a product, it is not preferable that the accuracy of classification for the evaluation data is deteriorated. It should be noted that the teacher data configuring the evaluation data is also called correct answer data.

On the other hand, the techniques described in Patent Literature 2 and Patent Literature 3 have been known.

Patent Literature 2 describes "an information processing device 10 for making an inference using parameters includes: a data acquisition unit 31 for acquiring input data; a basic parameter storage unit 41 for storing a parameter before additional learning; a difference parameter storage unit 40 for storing a first difference parameter that is a difference between a parameter used for inference and a basic parameter; additional learning means 42 for calculating a difference between a parameter after the additional learning for the basic parameter and the basic parameter as a second difference parameter; update means 43 for updating the first difference parameter stored in the difference parameter storage unit 40 on the basis of the first difference parameter and the second difference parameter; and an inference unit 34 for making an inference for the input data by using a model parameter generated on the basis of the basic parameter and the difference parameter updated by the update means."

In addition, Patent Literature 3 describes "a parameter estimation device that estimates an estimation target parameter value by a neural network is configured in such a manner that the neural network is set to have learned by changing a coupling method as previously defined for each region represented by some of a plurality of input parameters, one of the regions is determined from some of the plurality of input parameter values received by region determination means, and the coupling method is changed by route change means in the same manner as when learning the coupling method of the neural network according to the region determined by the region determination means."

CITATION LIST

Patent Literature

[Patent Literature 1] Japanese Unexamined Patent Application Publication No. 2019-027927
[Patent Literature 2.1] Japanese Unexamined Patent Application Publication No. 2017-138808
[Patent Literature 3] Japanese Unexamined Patent Application Publication No. Hei 11-85719

SUMMARY OF INVENTION

Technical Problem

However, in the technique described in Patent Literature 2, it is possible to reproduce the characteristics of the classifier at the time of shipment, but in the case where the classifier actually performs the classification, a change in the classification result is unavoidable because the parameter obtained by adding the basic parameter and the difference parameter is used.

In addition, the technique described in Patent Literature 3 can be applied to a case where the number of dimensions of the input signal is small, but in the case of a multidimensional signal such as an image, it is necessary to generate an enormous amount of classifiers, which is unrealistic. In addition, in machine learning, more learning data is required in order to acquire general-purpose feature amounts and classification performance, and it is not preferable to divide the learning data into regions.

The present invention proposes a generation method of a classifier that efficiently and effectively improves the classification accuracy of a classifier.

Solution to Problem

The following is a representative example of the invention disclosed in the application. That is, provided is a computing machine having an arithmetic device, a storage device connected to the arithmetic device, and an interface connected to the arithmetic device and generating a classifier for classifying an arbitrary event, the machine including: a storage unit that stores learning data configured using first input data and first teacher data; a learning unit that executes learning processing for generating the classifier by using the learning data stored in the storage unit; and a generation unit that generates the learning data, wherein the generation unit calculates a feature amount vector handled by the classifier by using the first input data of the learning data stored in the storage unit, analyses the distribution of the learning data in a feature amount space formed by the feature amount vector on the basis of the feature amount vector of the learning data to specify a boundary where the classification result of the classifier changes in the feature amount space, generates first pseudo input data by using the feature amount vector of representative learning data that is the learning data existing in the vicinity of the boundary, generates new learning data configured using the first pseudo input data and the first teacher data of the representative learning data, and stores the new learning data in the storage unit.

Advantageous Effects of Invention

According to the present invention, it is possible to generate a classifier with the classification accuracy efficiently and effectively improved. Problems, configurations, and effects other than those described above will become apparent from the following description of embodiments.

BRIEF DESCRIPTION OF DRAWINGS

FIG. 5 is a flowchart for explaining an example of processing executed by a pseudo sample generation unit of the first embodiment.

FIG. 6A is a diagram for showing an example of the distribution and distribution density of learning data in a feature amount space calculated by the pseudo sample generation unit of the first embodiment.

FIG. 68 is a diagram for showing an example of the distribution and distribution density of learning data in the feature amount space calculated by the pseudo sample generation unit of the first embodiment.

DESCRIPTION OF EMBODIMENTS

Figure 1:
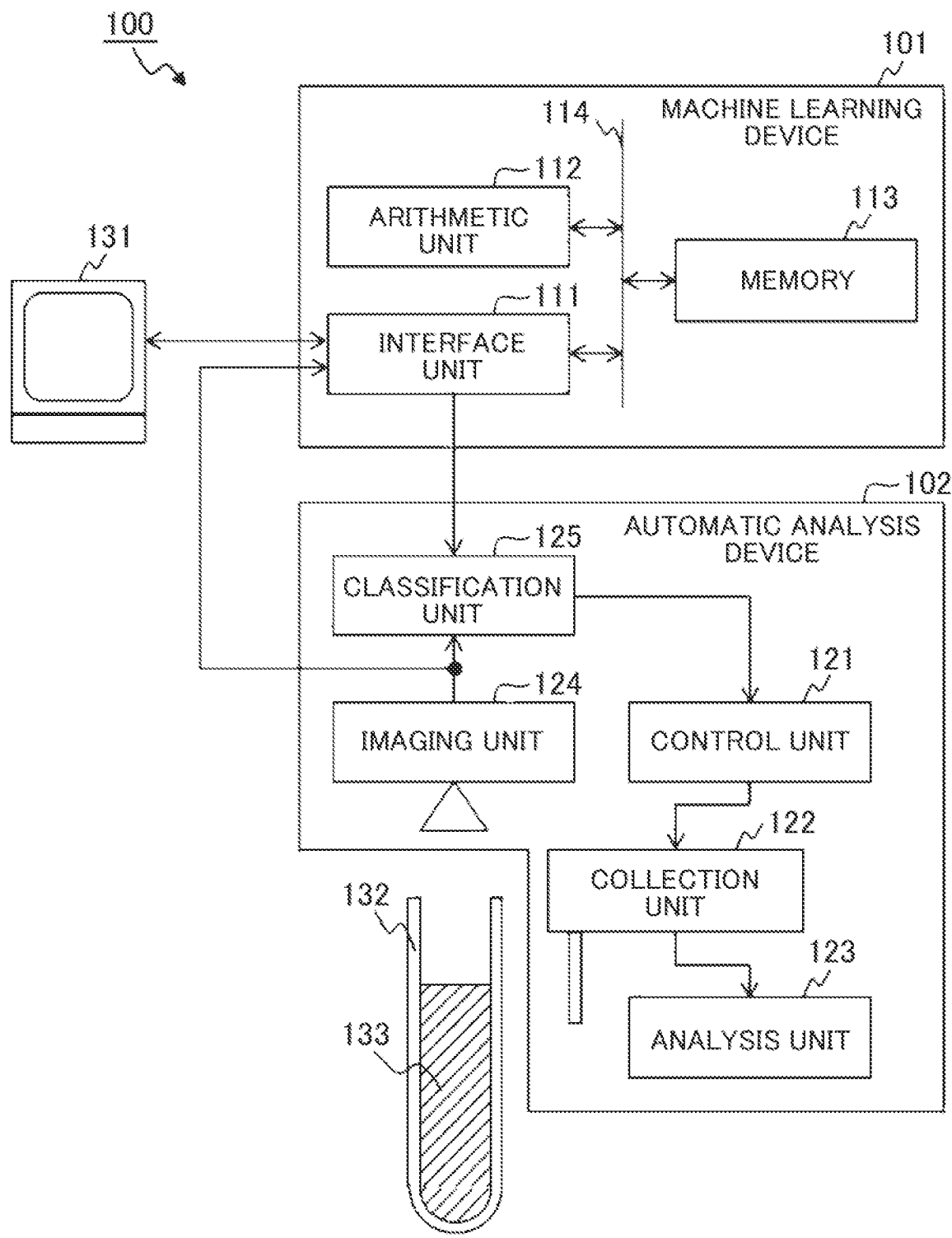
FIG. 1 is a diagram for explaining an example of a configuration of an automatic analysis system of a first embodiment.

Hereinafter, embodiments of the present invention will be described by using the accompanying drawings. It should be noted that in the following description and the accompanying drawings, constitutional elements having the same functions are denoted by the same reference numerals and duplicate descriptions are omitted. It should be noted that the expressions such as "first", "second", and "third" in the specification and the like are added to classify the constitutional elements and do not necessarily limit a number or an order. It should be noted that the positions, sizes, shapes, ranges, and the like of the respective configurations shown in the drawings and the like do not represent the actual positions, sizes, shapes, ranges, and the like in some cases in order to facilitate understanding of the invention. Therefore, the present invention is not limited to the positions, sizes, shapes, ranges, and the like disclosed in the drawings and the like.

First Embodiment

FIG. 1 is a diagram for explaining an example of a configuration of an automatic analysis system 100 of a first embodiment. The automatic analysis system 100 includes a machine learning device 101 and an automatic analysis device 102. A user interface 131 operated by a user is connected to the automatic analysis system 100.

The user interface 131 is configured using input devices such as a mouse and a keyboard and output devices such as a display and a printer. The input devices and the output devices may be separate devices.

First, a configuration of the automatic analysis device 102 will be described.

The automatic analysis device 102 includes an imaging unit 124, a classification unit 12b, a control unit 121, a collection unit 122, and an analysis unit 123. The hardware is connected to each other via a bus (not shown).

The imaging unit 124 is a device for imaging a container 132 and a collection target 133 contained in the container 132, and is, for example, a camera. The container 132 is a test tube or the like, and the collection target 133 is a sample such as blood and urine, a reagent to be reacted with the sample, a reaction solution obtained by reacting the sample and the reagent, or the like. The imaging unit 124 is installed on the opening side of the container 132, that is, above the container 132, and images the container 132 and the collection target 133 from above the container 132. An image imaged from above the container 132 by the imaging unit 124 is referred to as an upper image.

The upper image may be a still image such as BMP, PNG, or JPEG, or a frame image extracted from a moving image such as MPEG or H.264 at regular intervals.

The classification unit 125 classifies the states of the sample and the reagent by inputting the upper image as input data to a classifier. For example, the classification unit 125 classifies the presence or absence of air bubbles and foreign objects on the sample surface that interfere with sample collection. The classifier is generated using machine learning such as Neural Network and SVM (Support Vector Machine).

The control unit 121 is a device for controlling an operation of the collection unit 322 on the basis of the classification result output from the classification unit 125, and is, for example, a CPU (Central Processing Unit) or the like.

The collection unit 122 is a device for collecting the collection target 133 from the container 132, and is, for example, a dispensing probe or the like.

The analysis unit 123 is a device for performing analysis using the collection target 133, and is, for example, an immunoanalysis device or the like. The result of the analysis by the analysis unit 123 is displayed on a display (not shown) or the like.

Next, a configuration of the machine learning device 101 will be described.

The machine learning device 101 includes an interface unit 111, an arithmetic unit 112, a memory 113, and a bus 114. The interface unit 111, the arithmetic unit 112, and the memory 113 transmit and receive information to and from each other via the bus 114.

The interface unit 111 is a device for connecting to an external device. The machine learning device 101 connects the automatic analysis device 102 and the user interface 131 to each other via the interface unit ill. The interface unit 111 receives the upper image from the imaging unit 124 and receives a signal input by an operator operating the user interface 131.

The arithmetic unit 112 is a device for executing various types of processing of the machine learning device 101, and includes, for example, a CPU, an FPGA (Field-Programmable Gate Array), and the like. The function executed by the arithmetic unit 112 will be described by using FIG. 2.

The memory 113 is a device for storing a program executed by the arithmetic unit 112, various information (parameters and coefficients) used by the program, processing results, and the like, and includes an HDD (Hard Disk Drive), a SAM (Random Access Memory), a ROM (Read Only Memory), a flash memory, and the like. In addition, the memory 113 includes a work area used by the program.

It should be noted that the machine learning device 101 may be provided in a system different from the automatic analysis system 100. In this case, the machine learning device 101 transmits and receives information such as images and arithmetic results to and from the automatic analysis device 102 via communication means such as a network.

It should be noted that although the interface unit ill is directly connected to the imaging unit 124 and the classification unit 125 of the automatic analysis device 102 in FIG. 1, the automatic analysis device 102 may be provided with a memory and images and processing results of the arithmetic unit 112 may be transmitted and received via the memory.

In addition, although the automatic analysis system 100 including the automatic analysis device 102 will be described as an example of a method of using the machine learning device 101 in the specification, it is possible to use the machine learning device 101 without limiting to the automatic analysis device 102 as long as the automatic analysis system 100 is a system for performing image recognition, image detection, segmentation, or the like using machine learning or the like.

Figure 2:
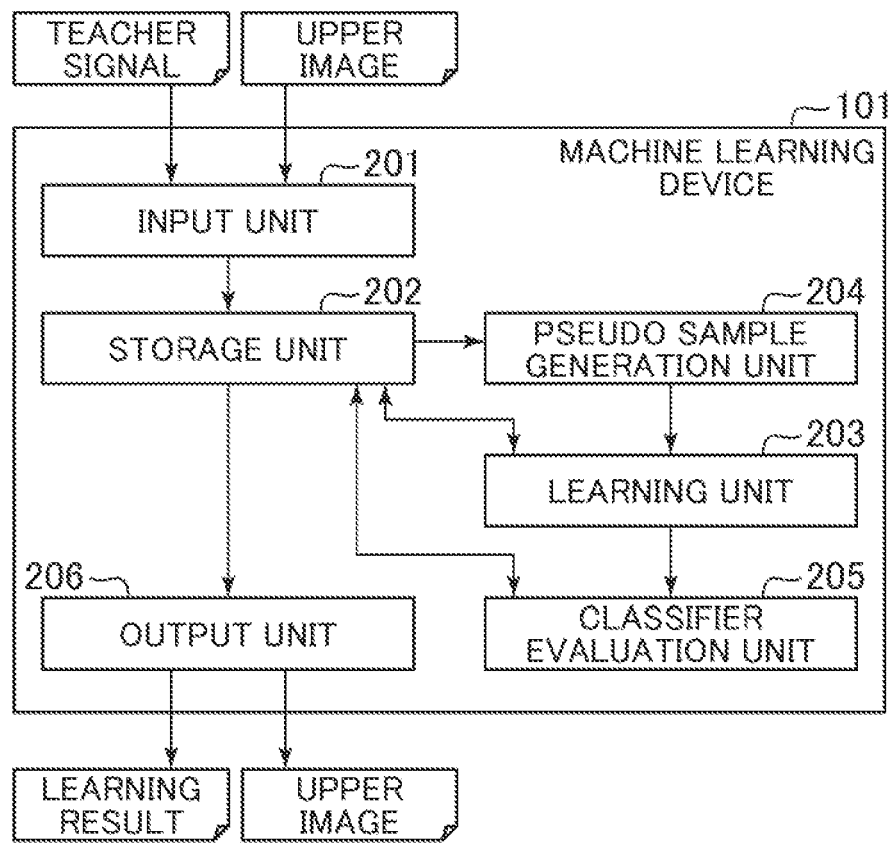
FIG. 2 is a diagram for explaining an example of functional blocks of a machine learning device of the first embodiment.
Figure 3:
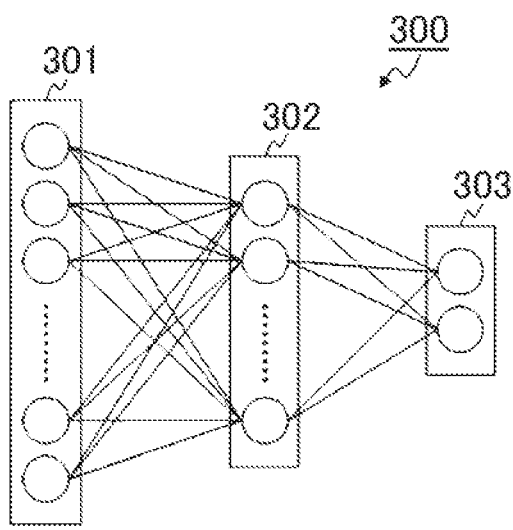
FIG. 3 is a diagram for showing an example of the structure of a classifier generated by the machine learning device of the first embodiment.

FIG. 2 is a diagram for explaining an example of functional blocks of the machine learning device 101 of the first embodiment. FIG. 3 is a diagram for showing an example of the structure of a classifier generated by the machine learning device 101 of the first embodiment.

The machine learning device 101 includes an input unit 201, a storage unit 202, a learning unit 203, a pseudo sample generation unit 204, a classifier evaluation unit 205, and an output unit 206. In the first embodiment, it is assumed that the input unit 201, the storage unit 202, the learning unit 203, the pseudo sample generation unit 204, the classifier evaluation unit 205, and the output unit 206 are realized by the arithmetic unit 112 for executing a program. It should be noted that each of the above-described functional units may be realized using dedicated hardware.

The input unit 201 receives the upper image from the automatic analysis device 102 and stores the same in the storage unit 202. In addition, the input unit 201 outputs the received upper image to the user interface 131 via the output unit 206, and receives a teacher signal for the upper image from the user. Data obtained by associating the teacher signal with the upper image is stored as learning data.

The acquisition processing of the teacher signal may be performed in the case where the upper image is received, may be collectively performed for a plurality or upper images after a certain period of time elapses since the upper image is stored in the storage unit 202, or may be performed in the case where a user request is received.

The output unit 206 outputs the upper image, a learning result, and the like.

The storage unit 202 stores various information. Specifically, the storage unit 202 stores information (parameters and coefficient groups) of the classifier used by the classification unit 125 of the automatic analysis device 102, a learning data set used in the case where the classifier is generated by machine learning, an evaluation data set used to evaluate the classifier, an evaluation result of the classifier using the evaluation data, and a pseudo sample generated by the pseudo sample generation unit 204. It should be noted that a part of the learning data is used as the evaluation data in some cases. In addition, the storage unit 202 stores the upper image received by the input unit 201, and stores the teacher signal input for the upper image by associating with the upper image. It should be noted that the evaluation result of the classifier is stored for each generation of learning processing.

Here, the evaluation result of the classifier is a classification such as the presence or absence or probability of bubbles for the evaluation data, a classification accuracy for the evaluation data, or the like.

The learning unit 203 will be described.

The learning unit 203 generates information defining the classifier used by the classification unit 125 of the automatic analysis device 102, for example, a coefficient group of a neural network by executing machine learning. In the embodiment, machine learning for generating a neural network including three fully connected layers as a classifier will be described as an example.

A network 300 shown in FIG. 3 shows a neural network configured using three fully connected layers of an input layer 301, a hidden layer 302, and an output layer 303. Each layer includes one or more units.

The input layer 301 is a layer for receiving an input signal, and for example, the luminance of each pixel of the upper image is input to each unit.

The hidden layer 302 is a layer for obtaining feature amounts from the input signal. For example, the unit of the hidden layer 302 substitutes an input signal Xi, a weight Wji, and a bias bj received from each unit of the input layer 301 into Equation (1) to calculate a feature amount Yj.

[Equation 1]

$$Yj = f\left(\sum_{i=0}^{N-1} Xi * Wji + bj\right) \quad (1)$$

Here, N represents the number of pixels of the upper image. The function f is an activation function, such as a Sigmoid function, a tanh function, or a ReLU function.

The output layer 303 is a layer for obtaining a final output. For example, the feature amount Yj, the weight Wkj, and the bias bk of the hidden layer 302 are substituted into Equation (2) to calculate a final output Zk.

[Equation 2]

$$Zk = \text{softmax}\left(\sum_{j=0}^{H-1} Yj * Wkj + bk\right) \quad (2)$$

Here, H represents the number of units of the hidden layer 302. In addition, softmax is a function for calculating a probability, and is defined as Equation (3).

[Equation 3]

$$\text{softmax}(Vk) = \frac{\exp(Vk)}{\sum_{l=0}^{M-1} \exp(Vl)} \quad (3)$$

Here, M represents the number of classes of the classification result.

In the neural network, a loss function representing the difference between the final output Zk and a teacher signal T is generally calculated, and the weight Wji and the weight Wkj for minimizing the loss function are obtained on the basis of the gradient descent method. Negative Log Likelihood, Hinge Loss, or the like is used as the loss function.

In the specification, processing of updating a coefficient group such as the weight Wji and the weight Wkj on the basis of the gradient descent method is referred to as learning. In addition, a vector configured using the feature amount Yj output from each unit of the hidden layer 302 is referred to as a feature amount vector.

It is assumed that the coefficient group calculated by the learning described above is stored in the storage unit 202 as information of the classifier.

It should be noted that although the neural, network including three fully connected layers is used as an example of the network 300, the number of hidden layers may be increased, or a convolutional neural network or the like may be used instead of the fully connected layers. In this case, the feature amount refers to the output signal of the hidden layer immediately before the output layer (final hidden layer).

In addition, the learning unit 203 of the first embodiment executes re-learning using the learning data set preliminarily stored in the storage unit 202, the upper image newly input from the input unit 201 and the teacher signal associated therewith, and the learning data generated by the pseudo sample generation unit 204 to be described later. Accordingly, it is possible to obtain a coefficient group having a higher classification accuracy than when the coefficient group (classifier) stored in the storage unit 202 is used before executing the re-learning.

In machine learning, as a method of improving the robustness of the classifier, the learning data is added by increasing the number of patterns of the learning data. The addition of the learning data refers to generation of the learning data on the basis of a method of a perturbation such as the position, rotation angle, and luminance of the learning data, and generation of the learning data using a generator or the like.

Figure 4A:
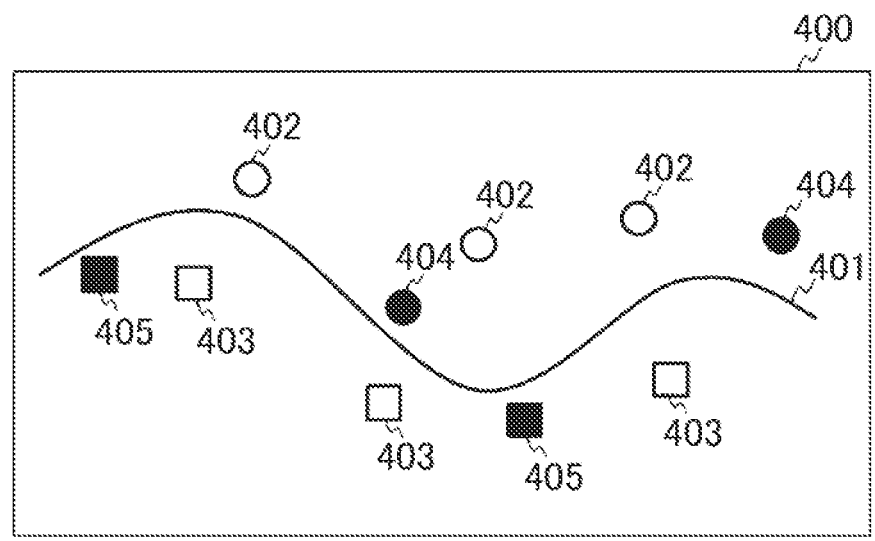
FIG. 4A is a diagram for explaining changes in the classification result of a classification unit before and after re-learning of the first embodiment.

The addition of the learning data has an effect of improving the robustness of the classifier. However, the number of patterns of the combinations of perturbations such as the above-described position, rotation angle, and luminance is enormous, and it is not practical to use the learning data of all the combinations for learning. On the other hand, it is difficult to judge what kind of learning data is effective in improving the classification accuracy of the classifier. In addition, there is also the following problem by re-learning using the added learning data. FIG. 4A and FIG. 4E are diagrams each explaining changes in the classification result of the classification unit 125 before and after the re-learning of the first embodiment.

Here, a classifier for classifying the presence or absence of bubbles will be described as an example. The classifier outputs the probability of "with bubbles" and "without bubbles".

Figure 4B:
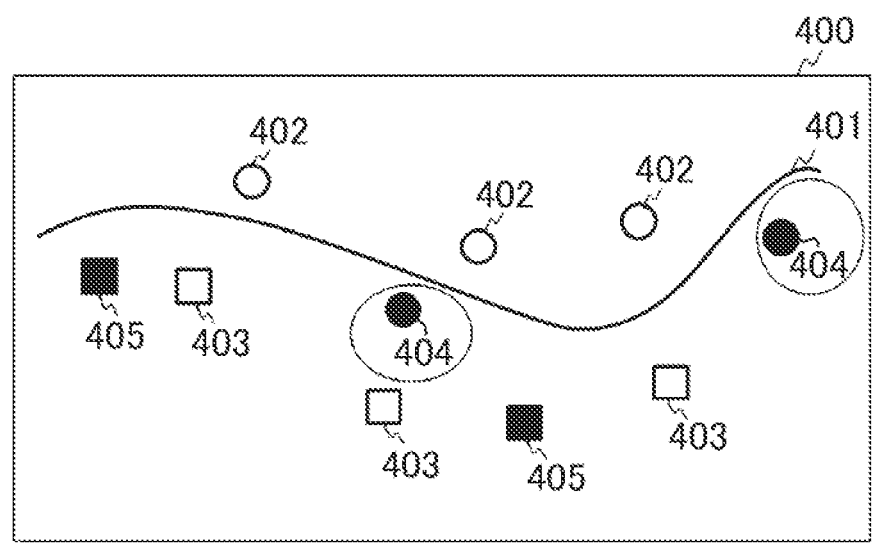
FIG. 4B is a diagram for explaining changes in the classification result of the classification unit before and after re-learning of the first embodiment.

FIG. 4A and FIG. 4B show diagrams in which the learning data and the evaluation data are plotted in a feature amount space 400. In the feature amount space 400, the learning data and the evaluation data are represented as feature amount vectors. In the following description, in the case where the input data of the learning data and the evaluation data is not distinguished, the data is referred to as a sample. In FIG. 4A and FIG. 4B, the types of teacher signals of the classifier are expressed as the shapes (circles and squares) of samples. In addition, the learning data is expressed in white, and the evaluation data is expressed in black.

A classification surface 401 represents the boundary of the classification result of each class in the feature amount space 400. The samples positioned above the classification surface 401 show samples determined as "with bubbles", and the samples positioned below the classification surface 401 show samples determined as "without bubbles".

When viewed from the perspective of the probability of "with bubbles" and "without bubbles" output by the classifier, the samples positioned on the classification surface 401 have the same values of both probabilities, the samples positioned above the classification surface 401 are superior in the probability of "with bubbles", and the samples positioned below the classification surface 401 are superior in the probability of "without bubbles".

FIG. 4A shows an example of the feature amount space 400 and the classification surface 401 before re-learning.

Learning data 402 and learning data 403 are data used for learning of the classifier. The learning data 402 represents learning data in which the teacher signal is "with bubbles", and the learning data 403 represents learning data in which the teacher signal is "without bubbles".

The learning unit 203 updates the classifier so as to output a correct classification result to the learning data 402 and

403. As a result of the learning using the learning data 402 and 403, the classification surface 401 is formed.

Evaluation data 404 and evaluation data 405 are data used for evaluating the classifier, and are not referred to at the time of learning. The classification accuracy and the classification result of the classifier for the evaluation data are important for the performance of the classifier. The evaluation data 404 represents evaluation data in which the teacher signal is "with bubbles", and the evaluation data 405 represents evaluation data in which the teacher signal is "without bubbles".

In FIG. 4A, the evaluation data 404 is positioned above the classification surface 401 and the evaluation data 405 is positioned below the classification surface 401, which indicates that the classifier correctly outputs the classification result.

FIG. 4B shows an example of the feature amount space 400 and the classification surface 401 after re-learning.

The classification surface 401 is changed from the classification surface 401 of FIG. 4A by re-learning. The classifier can correctly classify the learning data 402 and the learning data 403 as similar to before the re-learning. However, the evaluation data 404 indicated by the circular frame is positioned below the classification surface 401, and the classification result is "without bubbles". As a result of the change of the classification surface 401 by re-learning, there is a case where erroneous classification that did not occur before the re-learning occurs.

As reasons that the classification surface 401 changes as described above, there are various factors such as the configuration of the learning data, the order of learning, the configuration of the classifier, the initial value of the weight of the classifier, the convergence method of learning, and the number of times of learning.

As one of the methods for making the classification surfaces 401 similar before and after the re-learning, there is a method called transfer learning. A random number is used as the initial, value of a weight in ordinary learning, but a coefficient group of a classifier before re-learning is used as the initial value of re-learning in transfer learning. Accordingly, since the classification surface 401 before re-learning is used as a starting point, the classification surface 401 is easily maintained. However, despite that the main purpose of re-learning is to correct the classification surface for a sample group that cannot be correctly classified by the classifier before re-learning, learning is started from the state in which the samples cannot be correctly classified in the case of transfer learning, and thus it may be more difficult to improve the classification accuracy for erroneous classification than the case where earning is started from a random number.

In order to solve the above-described problem, the pseudo sample generation unit 204 to be described later generates learning data for re-learning on the basis of the distribution of the learning data in the feature amount space 400.

In the first embodiment, a pseudo sample (input data) for reproducing the classification surface 401 before re-learning is generated for a region where the distribution density of the learning data is high in the feature amount space 400. Accordingly, it is possible to suppress a change in the classification surface 401 in the region where the learning data is dense, and to improve the classification accuracy by re-learning for a sample that the classifier could not correctly classify before re-learning (that is, a region where learning is insufficient).

As the execution timing of the re-learning, a case in which a certain number of sets of new upper images and teacher data are stored in the storage unit 202, a case in which a certain number of upper images of erroneous classification are stored, and the like are conceivable. In addition, in the case where an instruction to start re-learning using the user interface 131, a communication device, or the like by a user or a system administrator is received via the input unit 201, re-learning may be executed.

Next, the pseudo sample generation unit 204 will be described.

Figures 6B, 7:
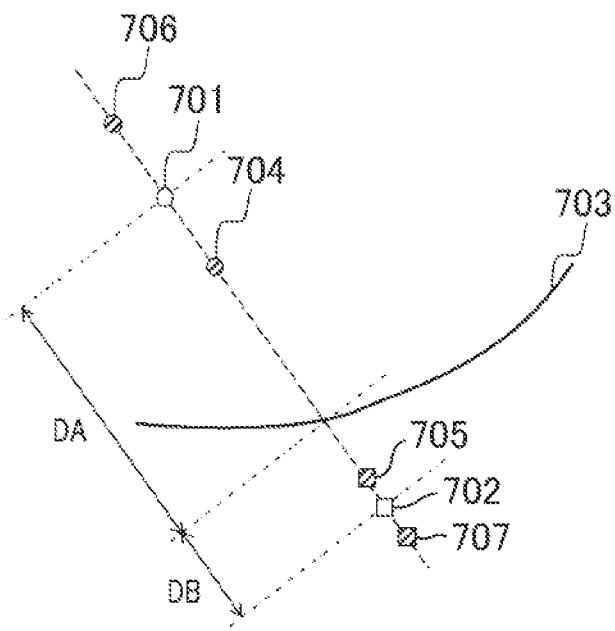
FIG. 7 is a diagram for shoving an example of a method of calculating a vector to be generated by the pseudo sample generation unit of the first embodiment.

FIG. 5 is a flowchart for explaining an example of processing executed by the pseudo sample generation unit 204 of the first embodiment. FIG. 6A and FIG. 6B are diagrams each showing an example of the distribution and distribution density of the learning data in a feature amount space calculated by the pseudo sample generation unit 204 of the first embodiment. FIG. 7 is a diagram for showing an example of a method of calculating a vector to be generated by the pseudo sample generation unit 204 of the first embodiment.

The pseudo sample generation unit 204 calculates the distribution density of the learning data in the feature amount space (Step S501). Here, the feature amount indicates the output of the hidden layer 302 in FIG. 3, and the feature amount space is an H-dimensional space having H feature amounts as axes. Specifically, the following processing is executed.

The pseudo sample generation unit 204 inputs learning data (input data) to the network 300 to acquire a feature amount vector of the learning data and records the same in a work area.

The pseudo sample generation unit 204 calculates the distribution density of the learning data by using a feature amount vector group. As an example of the method of calculating the distribution density, there is a method of using an H-dimensional kernel for extracting a subspace of the feature amount space to count the number of data included in the kernel while scanning the feature amount space.

In addition, the pseudo sample generation unit 204 specifies the boundary surface on the basis of the feature amount vector group and the teacher data of the learning data. As a method of specifying the boundary surface, for example, there is a method of obtaining the same by using the least square method.

It should be noted that in the case where the number of dimensions of the feature amount vectors is large, the arithmetic time for specifying the boundary surface becomes long, and the amount of computing machine resources to be required also becomes large. Thus, the number of dimensions of the feature amount vectors may be reduced according to the arithmetic time and the amount of computing machine resources. For example, there is a method of reducing the number of dimensions of the feature amount vectors by executing principal component analysis.

In FIG. 6A and FIG. 6B, it is assumed that H is equal to 2 for simplifying the explanation. A learning data distribution 601 shown in FIG. 6A shows the distribution of the learning data in the feature amount space using a feature amount Y0 and a feature amount Y1 as axes. A distribution density 602 shown in FIG. 6B is obtained as a result of obtaining the distribution density of the learning data by setting a kernel size of 11×11 and a slide width of 5×5 of the kernel for the learning data distribution 601. As the density in the kernel is lower, they are displayed to be whiter, and as the density is higher, they are displayed to be darker.

The above is the description of the processing of Step S501.

Next, the pseudo sample generation unit 204 extracts representative learning data positioned in the vicinity of the classification surface on the basis of the distribution density of the learning data (Step S502). Specifically, the following processing is executed.

The pseudo sample generation unit 204 specifies a region where the distribution density of the learning data is high. As a specifying method, for example, there is a method in which a threshold value is provided in advance and a region where the distribution density is equal to or larger than the threshold value is selected.

The pseudo sample generation unit 204 determines a representative point for the specified region. As the representative point, for example, the maximum point, the centroid point, or the like of the distribution density in each specified region is used.

The pseudo sample generation unit 204 extracts learning data having a position closest to the representative point in the feature amount space. In the following description, the input data of the extracted learning data is referred to as a neighborhood sample.

A neighborhood sample group is a sample group that largely affects the formation position of the classification surface. In the embodiment, the pseudo samples are generated so as to maintain the positional relationship between the neighborhood samples, so that the classification surface after the re-learning can easily reproduce the classification surface before the re-learning.

The above is the description of the processing of Step S502.

Next, the pseudo sample generation unit 204 calculates a feature amount vector for generating the pseudo sample (Step S503). In the following description, the feature amount vector is referred to as a vector to be generated. Specifically, the following processing is executed.

For each neighborhood sample associated with the teacher data of "without bubbles", the pseudo sample generation unit 204 specifies the neighborhood sample having the shortest distance with each neighborhood sample associated with the teacher data of "without bubbles" and associated with the teacher data of "with bubbles". In the following description, the neighborhood sample associated with the teacher data of "without bubbles" is referred to as a first neighborhood sample, and the neighborhood sample associated with the teacher data of "with bubbles" is referred to as a second neighborhood sample.

The pseudo sample generation unit 204 substitutes a feature amount vector FA of the first neighborhood sample and a feature amount vector FB of the specified second neighborhood sample into Equation (4) and Equation (5) to calculate a vector to be generated FA' and a vector to be generated FB'.

[Equation 4]

$$FA' = FA + a(FB - FA) \quad (4)$$

[Equation 5]

$$FB' = FB - b(FB - FA) \quad (5)$$

Here, (FB−FA) is a vector on the feature amount space representing the position of the feature amount vector FB with the feature amount vector FA as the origin. The coefficient a and the coefficient b are coefficients for determining the magnitude of perturbations for the vector to be generated FA' and the vector to be generated FB', and are set in accordance with the distance from the classification surface. A specific setting example will be described later.

The relationship between the neighborhood sample and the vector to be generated will be described in detail by using FIG. 7.

A neighborhood sample 701 indicates the first neighborhood sample, and a neighborhood sample 702 indicates the second neighborhood sample. The feature amount vector of the neighborhood sample 701 is FA, and the feature amount of the neighborhood sample 702 is FB. The neighborhood sample 701 is positioned at coordinates separated from the classification surface 703 only by a distance DA, and the neighborhood sample 702 is positioned at coordinates separated from the classification surface 703 only by a distance DB. A vector to be generated FA' 704 and a vector to be generated FA" 706 are vectors to be generated that are generated from the first neighborhood sample 701, and a vector to be generated FB'705 and a vector to be generated FB" 707 are vectors to be generated that are generated from the second neighborhood sample 702.

The vector to be generated FA' 704 is a vector calculated on the basis of Equation (4), and the vector to be generated FB'705 is a vector calculated on the basis of Equation (5). Here, a calculation example of the coefficient a is shown in Equation (6).

[Equation 6]

$$a = DA * r \quad (6)$$

According to Equation (6), the coefficient a is a value proportional to the distance DA. In addition, r is a proportional constant related to the distance DA and a, and is a real value between 0.0 and 1.0. In FIG. 7, r=0.3. Thus, the vector to be generated FA' 704 calculated by Equation (4) is positioned at coordinates where the feature amount vector FA is moved only by DA*0.3 from the first neighborhood sample 701 toward the second neighborhood sample 702.

Equation (6) describes the coefficient a, but can also be applied to the coefficient b by replacing the distance DA with the distance DB and the coefficient a with the coefficient b. Thus, the vector to be generated FB'705 calculated by Equation (5) is positioned at coordinates where the feature amount vector FB is moved only by DB*0.3 from the second neighborhood sample 702 toward the first neighborhood sample 701.

By arranging the vector to be generated in a wide range in proportion to the distance from the classification surface 703 as described above, it is possible to suppress the classification surface after the re-learning from coming excessively close to the neighborhood sample, so that the classification surface maintaining the positional relationship with the neighborhood sample can be reproduced.

In addition, in order to maintain the center position of the distribution, the vector to be generated FA" 706 and the vector to be generated FB" 707 may be generated as shown in Equations (7) and (8). It should be noted that the positive and negative signs of the coefficients are reversed between Equations (4) and (5) that are the equations for calculating the vector to be generated FA' 704 and the vector to be generated FB'705.

[Equation 7]

$$FA'' = FA - a(FB - FA) \quad (7)$$

[Equation 8]

$$FB'' = FB + b(FB - FA) \quad (8)$$

By adding learning data to both sides of the first neighborhood sample 701 and the second neighborhood sample 702 that are distribution centers, changes in the positions of the neighborhood sample 701 and the neighborhood sample 702 on the feature amount space are suppressed.

In addition, although the example of generating a pair of vectors to be generated has been described above, a plurality of vectors to be generated may be generated. Equation (9) shows an example of an equation for calculating the coefficient a in the case where a plurality of vectors to be generated is generated.

[Equation 9]

$$\alpha \in [0, \alpha'] \quad (9)$$

In the equation, a' represents the maximum value of the range of the coefficient a, and, for example, the value calculated by Equation (6) is set to a', so that a plurality of vectors to be generated can be generated while randomly changing the coefficient a between 0 and a'. In addition, although the example of changing the position of the vector to be generated according to the distance has been described above, the number of vectors to be generated may be changed according to the distance.

The above is the description of the processing of Step S503.

Next, the pseudo sample generation unit 204 generates an upper image (pseudo sample) that is input data on the basis of the vector to be generated, and further generates learning data including the upper image (Step S504). The generated learning data is stored in the storage unit 202. Specifically, the following processing is executed.

The pseudo sample generation unit 204 copies the neighborhood sample that is the calculation source of the vector to be generated, and sets the sample as an additional sample I.

The pseudo sample generation unit 204 updates the additional sample I on the basis of Equation (10).

[Equation 10]

$$I_{t+1} = I_t + \frac{\sigma |Z - F_t|}{\sigma I_t} \quad (10)$$

Here, It represents time t, and It+1 represents the additional sample I at time t+1. Z represents the vector to be generated calculated in Step S503, and Ft represents the feature amounts obtained by inputting the additional sample It to the network 300. By repeatedly executing the operation of Equation (0.10) and updating It, an image for outputting the vector to be generated can be generated.

The pseudo sample generation unit 204 associates the generated image (pseudo sample) with the teacher signal to generate learning data. It should be noted that as the teacher signal associated with the generated image, the teacher signal of the neighborhood sample that is the copy source of the additional sample I is used.

It should be noted that the above is an example of a generation method, and the pseudo sample may be generated using a generator such as GAN (Generative Adversarial Networks) or VAE (Variational AutoEncoder). In the case where the generator is g, an image (input data) can be generated as similar to the above by an updating formula shown by Equation (11).

[Equation 11]

$$R_{t+1} = R_t + \frac{\sigma |Z - F(g(R_t))|}{\sigma R_t} \quad (11)$$

Here, Rt is an input vector to the generator at time t, and the generator g uses Rt as an input to generate generation data g (Rt) having the same number of dimensions as the additional sample I. In addition, F (g (Rt)) represents a feature amount vector obtained by inputting the generated data g (Rt) into the classifier.

By adding the learning data group generated by the flow described above to the learning data set, the positional relationship between the neighborhood samples is maintained, and the classification surface similar to that before the re-learning can be reproduced.

It should be noted that the pseudo sample generation unit 204 generates the learning data only for the region where the learning data is dense. Thus, the classification surface can be reproduced only for the region where the learning data is dense, that is, the region where the reliability of the classification result is high. On the other hand, in a region where the learning data is sparse, the classification accuracy is improved by re-learning.

Next, the classifier evaluation unit 205 will be described.

The classifier evaluation unit 205 compares the classification result of the classifier before the re-learning with the classification result of the classifier after the re-learning, and determines a classifier to be applied to the classification unit 125 of the automatic analysis device 102 on the basis of the comparison result.

Here, an example of an evaluation method will be described. The classifier evaluation unit 206 preliminarily stores the evaluation result for the evaluation data of the classifier before the re-learning in the storage unit 202. The classifier evaluation unit 205 obtains the evaluation result for the evaluation data stored in the storage unit 202 by using a classifier newly generated by the learning unit 203. The classifier evaluation unit 205 verifies the classification accuracies of the classifiers before and after the re-learning, or the difference of samples of erroneous classification between the classifiers before and after the re-learning, and determines a classifier to be applied to the classification unit 125.

For example, in order for the classifier evaluation unit 205 to verify that new erroneous classification has not occurred by the re-learning, there is a method in which it is confirmed that a set of samples of erroneous classification in the classifier after the re-learning is included in a set of samples of erroneous classification in the classifier before the re-learning, and the classifier after the re-learning is employed in the case where new erroneous classification has not occurred. An example of an evaluation formula is shown in Equation (12).

[Equation 12]

$$|M_\beta - M_\alpha| \leq Th_M \quad (12)$$

Mβ represents an erroneous classification set of the classifier after the re-learning, Ma represents an erroneous classification set of the classifier before the re-learning, | |represents the number of elements of the set, the minus represents an operation for obtaining a difference set, and ThM represents an allowable number for the number of erroneous classifications.

For example, in the case where Equation (12) is satisfied, the classifier evaluation unit 205 employs the classifier after the re-learning, and the classifier evaluation unit 205 employs the classifier before the re-learning in the case where Equation (12) is not satisfied. In the case where 0 is set to ThM, it is a condition for updating the classifier that new erroneous classification does not occur, and it can be guaranteed that the classification accuracy is not deteriorated due to the re-learning and updating of the classifier.

In addition to the above, a method of confirming whether or not the classification accuracy of the classifier after the re-learning is equal to or higher than the classification accuracy of the classifier before the re-learning may be used. An evaluation formula is shown in Equation (13).

[Equation 13]

$$A_\beta - A_\alpha \geq Th_A \tag{13}$$

Aα and Aβ represent classification accuracies for the evaluation data before and after the re-learning, respectively, and ThA represents a threshold value for the classification accuracy.

In the case where Equation (13) is satisfied, the classifier evaluation unit 205 employs the classifier after the re-learning, and the classifier evaluation unit 205 employs the classifier before the re-learning in the case where Equation (13) is not satisfied.

In addition, the evaluation data may be divided into a plurality of sets, and the evaluation method may be switched for each set. For example, it is possible to employ a method in which evaluation data that is easily classified or evaluation data having a large influence on analysis is divided into a first set, evaluation data that, is difficult to classify or evaluation data having a small influence even if classification fails is divided into a second set, it is verified that, new erroneous classification has not occurred in the first set and that the classification accuracy has not been deteriorated in the second set, and it is verified whether or not both are satisfied. In addition, it is possible to employ a method in which weights for the classification accuracy and the number of erroneous classifications of each set are set in advance, and a comprehensive evaluation is performed on the basis of the total value of values obtained by multiplying the classification accuracy and the number of erroneous classifications by the weights.

The classifier evaluation unit 205 outputs the evaluation result via the output unit 206. For example, the classifier evaluation unit 205 outputs, as the evaluation result, information indicating a change between the erroneous classifications of the classifiers before and after the re-learning. In addition, the classifier evaluation unit 205 outputs information of the employed classifier as the evaluation result.

According to the first embodiment, the machine learning device 101 generates new learning data for reproducing a classification surface for a region where the distribution density of the learning data in the feature amount space is high. In addition, the machine learning device 101 executes re-learning by using a learning data set with new learning data added, so that it is possible to efficiently improve the classification accuracy of a region with sparse learning data while suppressing variations in the classification result of a region with dense learning data. That is, it is possible to efficiently and effectively improve the classification accuracy of the classifier.

Second Embodiment

In a second embodiment, in addition to the learning data generated on the basis of the boundary surface, the machine learning device 101 adds the learning data to a region where the distribution density of the learning data in the feature amount space is low.

Since the distribution of the learning data in the feature amount space directly affects the generation of the classification surface, the machine learning device 101 of the second embodiment generates the learning data in a region where the distribution density of the learning data in the feature amount space is low. The distribution density of learning data in an input space formed using the learning data (input data) itself tends to be significantly different from the distribution density of the learning data in the feature amount space formed using the feature amounts handled by the classifier. Therefore, even if the learning data is added on the basis of the distribution density of the learning data in the input space, the classification accuracy of the classifier is not necessarily improved.

Hereinafter, the second embodiment will be described focusing on the difference from the first embodiment.

The configuration of an automatic analysis system 100 of the second embodiment is the same as that of the first embodiment. The hardware configuration and the functional block configuration of a machine learning device 101 of the second embodiment are the same as those of the first embodiment. In addition, the hardware configuration and the functional, block configuration of an automatic analysis device 102 of the second embodiment, are the same as those of the first embodiment.

In the second embodiment, among the functional blocks provided in the machine learning device 101, processing executed by the pseudo sample generation unit 204 is partially different. Other functional blocks are the same as those in the first embodiment.

Figure 8:
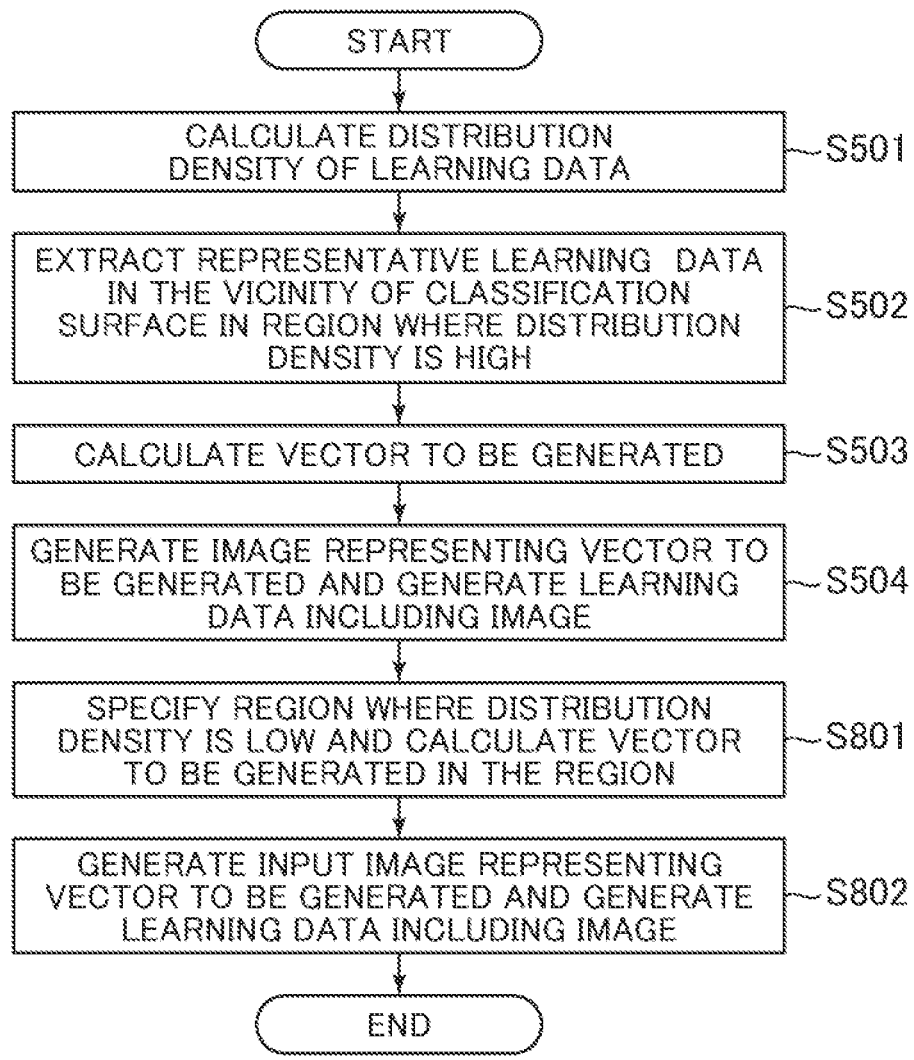
FIG. 8 is a flowchart for explaining an example of processing executed by a pseudo sample generation unit of a second embodiment.
Figure 9:
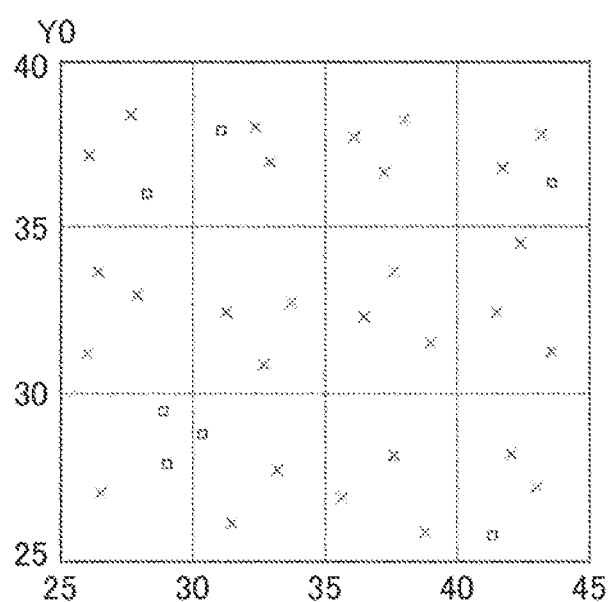
FIG. 9 is a diagram for shoving an example of a vector to be generated calculated by the pseudo sample generation unit of the second embodiment.

FIG. 8 is a flowchart for explaining an example of processing executed by the pseudo sample generation unit 204 of the second embodiment. FIG. 9 is a diagram for showing an example of a vector to be generated calculated by the pseudo sample generation unit 204 of the second embodiment.

Since the processing from Step S501 to Step S504 is the same as that in the first embodiment, the explanation thereof will be omitted.

After the processing of Step S504 is completed, the pseudo sample generation unit 204 calculates a vector to be generated in a region where the distribution density of the learning data is low (Step S801). Specifically, the following processing is executed.

The pseudo sample generation unit 204 specifies a region where the distribution density of the learning data is low. As a specifying method, for example, there is a method in which a threshold value is provided in advance and a region where the distribution density is smaller than the threshold value is selected.

The pseudo sample generation unit 204 randomly selects a plurality of points from the specified region and calculates the selected points as a vector to be generated. The method for determining the number of points to be selected includes, for example, a method of dividing the specified region into a plurality of grids and selecting so that the number of learning data included in each grid is equal.

A calculation method of the vector to be generated will be described with reference to FIG. 9. FIG. 9 shows a partial region 901 where Y0 is 25 or larger and smaller than 40 and VI is 25 or larger and smaller than 50 from learning data distribution 601. The partial region 901 is a region where distribution density 602 is 0 to 2 and the distribution density of the learning data is low. Square marks represent feature amount vectors of the learning data, and X marks represent vectors to be generated. In FIG. 9, the vectors to be generated are calculated so that three pieces of learning data (the feature amount vector of the learning data and the vector to be generated) are included in a grid obtained by dividing the feature amount space by a constant width. That is, more vectors to be generated are calculated in a region where the density is lower.

The above is the description of the processing of Step S801.

Next, the pseudo sample generation unit 204 generates an image (pseudo sample) on the basis of the vector to be generated, and generates learning data including the image (Step S802). The generated learning data is stored in the storage unit 202. Since the processing in Step S802 is similar to that in Step S504, the description thereof will be omitted. At this time, the teacher signal associated with the generated image uses the teacher signal of the learning data included in the specified region. It should be noted that the user may input the teacher signal by referring to the generated image.

By the processing in Step S801 and Step S802, the learning data can be added mainly to a region where the distribution density of the learning data in the feature amount space is low.

According to the second embodiment, the machine learning device 101 adds learning data to maintain the boundary surface in a region where the distribution density of the learning data in the feature amount space is high, and adds learning data to a region where the distribution density of the learning data in the feature amount space is low. In addition, the machine learning device 101 can efficiently improve the classification accuracy of the classifier by executing re-learning using a learning data set with new learning data added.

Third Embodiment

In a third embodiment, evaluation data is added to a region where the distribution density of the evaluation data in the feature amount space is low.

In an evaluation of the classifier generated by machine learning, comprehensiveness of the evaluation data is important. However, as described in the second embodiment, even if the evaluation data is comprehensively distributed in the input space, the distribution of the evaluation data is different in the feature amount space. Therefore, there is a possibility in the feature amount space that a sparse region and a dense region of the distribution of the evaluation data or a region where no evaluation data exists is generated. In this case, sufficient robustness cannot be ensured. Thus, there is a possibility that erroneous classification occurs after a product (automatic analysis device 102) equipped with a classifier is shipped.

Therefore, in the third embodiment, the method described in the second embodiment is applied to generate evaluation data for improving the quality of the evaluation of the classifier.

Hereinafter, the third embodiment will be described focusing on the difference between the first embodiment and the second embodiment.

The configuration of an automatic analysis system 100 of the third embodiment is the same as that of the first embodiment. The hardware configuration and the functional block configuration of a machine learning device 101 of the third embodiment are the same as those of the first embodiment. In addition, the hardware configuration and the functional block configuration of an automatic analysis device 102 of the third embodiment are the same as those of the first embodiment.

In the third embodiment, among the functional blocks provider in the machine learning device 101, processing executed by the pseudo sample generation unit 204 and the classifier evaluation unit 205 is partially different. Other functional blocks are the same as those in the first embodiment.

Figure 10:
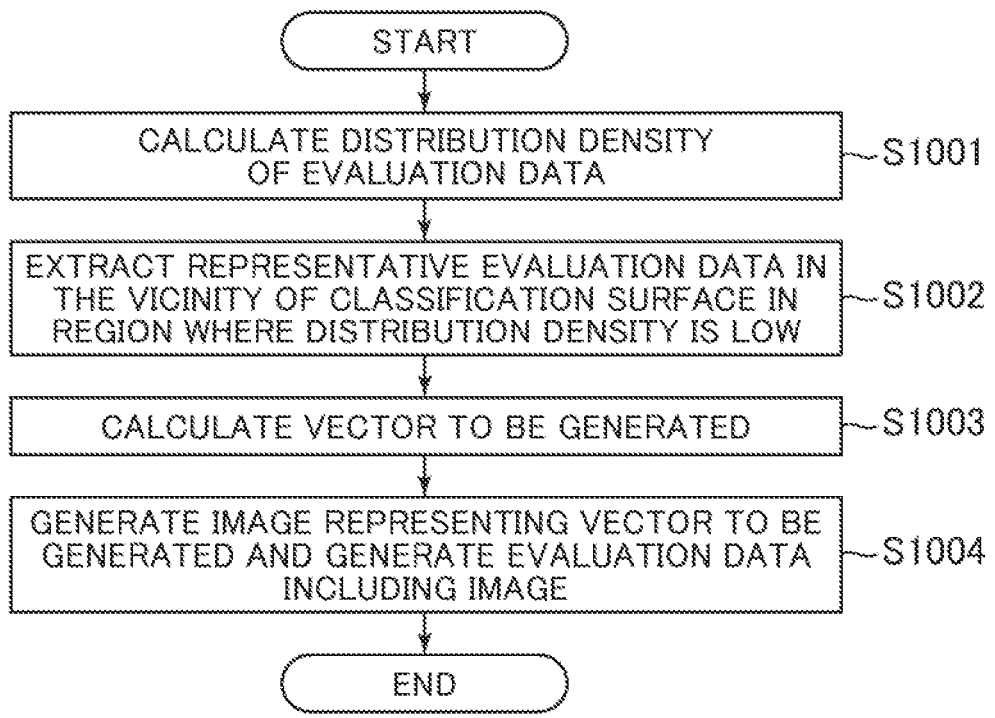
FIG. 10 is a flowchart for explaining an example of processing executed by a pseudo sample generation unit of a third embodiment.

First, the pseudo sample generation unit 204 will be described. FIG. 10 is a flowchart for explaining an example of processing executed by the pseudo sample generation unit 204 of the third embodiment.

The pseudo sample generation unit 204 calculates the distribution density of the evaluation data in the feature amount, space (Step S1001). The processing in Step S1001 is processing in which the processing target in Step S501 is replaced with the evaluation data.

Next, the pseudo sample generation unit 204 calculates a vector to be generated in a region where the distribution density of the evaluation data is low (Step S1002). The processing in Step S1002 is processing in which the processing target in Step S801 is replaced with the evaluation data.

Next, the pseudo sample generation unit 204 generates an image (pseudo sample) on the basis of the vector to be generated, and generates evaluation data including the image (Step S1003). The generated evaluation data is stored in the storage unit 202. The processing in Step S1003 is processing in which the processing target in Step S802 is replaced with the evaluation data.

By executing the processing described in FIG. 10, the evaluation data can be added mainly to a region where the distribution density of the evaluation data in the feature amount space is low.

Next, the classifier evaluation unit 205 will be described. The classifier evaluation unit 205 evaluates the classifier by using the evaluation data preliminarily stored in the storage unit 202 and the evaluation data generated by the pseudo sample generation unit 204. The evaluation method of the classifier may be a method for evaluating the comprehensive classification accuracy and erroneous classification of the evaluation data, or a method for evaluating the evaluation data as a separate evaluation data set. The verification method of the classification accuracy and erroneous classification and the evaluation method using a plurality of evaluation data sets are similar to those described in the first embodiment.

According to the third embodiment, the machine learning device 101 adds evaluation data to a region where the distribution density of the evaluation data in the feature amount space is low. The robustness of the classifier can be more accurately evaluated by evaluating the classifier using the existing evaluation data and the added evaluation data.

It should be noted that the present invention is not limited to the above-described embodiments, and includes various modified examples. In addition, for example, the embodiments have been described in detail to explain the configurations in a way that is easy to understand the present invention, and the present invention is not necessarily limited to those including all the configurations described above. In addition, some configurations of each embodiment can be added to, deleted from, and replaced by other configurations.

In addition, some or all of the above-described configurations, functions, processing units, processing means, and the like may be realized by hardware by, for example, designing with an integrated circuit. In addition, the present invention can be realized by a program code of software for realizing the functions of the embodiments. In this case, a storage medium recording a program code is provided to a computer, and a processor provided in the computer reads the program code stored in the storage medium. In this case, the program code itself read from the storage medium realizes the functions of the above-described embodiments, and the program code itself and the storage medium storing the program code configure the present invention. For example, a flexible disk, a CD-ROM, a DVD-ROM, a hard disk, an SSD (Solid State Drive), an optical disk, a magneto-optical disk, a CD-R, a magnetic tape, a nonvolatile memory card, a ROM, or the like is used as a storage medium for supplying such a program code.

In addition, the program code for realizing the functions described in the embodiments can be implemented in a wide range of programs or scripting languages such as assembler, C/C++, perl. Shell, PHP, Python, and Java.

Further, the program code of software for realizing the functions of the embodiments may be distributed via a network, and stored in storage means such as a hard disk or a memory of a computer or a storage medium such as a CD-RW or a CD-R, and a processor provided in the computer may read and execute the program code stored in the storage means or the storage medium.

In the above-described embodiments, the control lines and the information lines considered to be necessary in the explanation are shown, but ail the control lines and the information lines in a product are not necessarily shown. All the configurations may be connected to each other.

The invention claimed is:

1. A computing machine having an arithmetic device, a storage device connected to the arithmetic device, and an interface connected to the arithmetic device, the computing machine efficiently and effectively generates and improve classification accuracy a classifier for classifying an arbitrary event to avoid outputting a classification result that is erroneous, the computing machine comprising:
 a storage circuit that stores learning data configured using first input data and first teacher data;
 a learning circuit that executes a learning processing for generating the classifier by using the learning data stored in the storage circuit;
 a generation circuit that:
 generates the learning data,
 calculates a feature amount vector handled by the classifier by using the first input data, the feature amount vector forms a feature amount space and specifies a boundary where the classification result of the classifier changes in the feature amount space,
  analyzes a distribution of the learning data in the feature amount space formed by the feature amount vector,
  generates first pseudo input data by using the feature amount vector existing in a vicinity of the boundary,
  generates new learning data configured using the first pseudo input data and the first teacher data and to suppress the changes in the feature amount space of the new learning data to avoid outputting the classification result that is erroneous, and
 stores the new learning data in the storage circuit; and
 an output circuit that generates and outputs display information for presenting an analysis result of the changes in the feature amount space of the classification result, wherein the generation circuit specifies a region where the learning data is sparse on a basis of the distribution of the learning data in the feature amount space, generates second pseudo input data by using the feature amount vector included in the region, generates second new learning data configured using the second pseudo input data and the first teacher data of the learning data included in the region, and stores the second new learning data in the storage circuit,
 wherein the storage circuit stores evaluation data configured using second input data and second teacher data,
 wherein the computing machine includes an evaluation circuit that evaluates the classifier by using the evaluation data stored in the storage circuit,
 wherein the generation circuit calculates the feature amount vector by using the second input data of the evaluation data, analyzes a second distribution of the evaluation data in the feature amount space to specify a region where the evaluation data is sparse, generates second pseudo input data by using the feature amount vector included in the region, generates second new evaluation data configured using the second pseudo input data and the second teacher data of the evaluation data included in the region, and stores the second new evaluation data in the storage circuit,
 wherein the classifier is generated by machine learning via a neural network or support vector machine, and
 wherein the changes are suppressed in a classification surface in a region where the new learning data is dense to improve classification accuracy by re-learning for a sample that the classifier did not correctly classify before the re-learning.

2. The computing machine according to claim 1, wherein the first pseudo input data is generated on the basis of the feature amount vector positioned in the vicinity.

3. The computing machine according to claim 1, wherein the storage circuit stores evaluation data configured using second input data and second teacher data,
 wherein the computing machine includes an evaluation circuit that evaluates the classifier by using the evaluation data stored in the storage circuit,
 wherein, where the learning data generated by the generation circuit is stored in the storage circuit after generating a first classifier, the learning circuit generates a second classifier by executing the learning processing again, and
 wherein the evaluation circuit compares an output value obtained by inputting the second input data of the evaluation data to the first classifier and the second classifier with the second teacher data of the evaluation data to acquire corresponding classification results for the evaluation data of the first classifier and the second classifier, stores the corresponding classification results in the storage circuit, analyzes changes in the corresponding classification results, and determines which one of the first classifier and the second classifier to employ as the classifier on the basis of the changes in the corresponding classification results.

4. The computing machine according to claim 1, wherein the classification accuracy of the classifier is efficiently improved by executing re-learning using the new learning data.

5. A learning method of a classifier executed by a computing machine, the computing machine comprising at least one processor coupled to a memory storing learning data configured using first input data and first teacher data, the memory storing program code executable by the at least one processor to efficiently and effectively generate and improve a classification accuracy the classifier for classifying an arbitrary event to avoid outputting a classification result that is erroneous, the learning method comprising:
  executing a learning processing for generating the classifier by using the learning data stored in the memory; and
  generating new learning data by using the learning data stored in the memory and stores the new learning data in the memory, the generating of the learning data comprising:
    calculating a feature amount vector handled by the classifier by using the first input data, the feature amount vector forms a feature amount space and specifies a boundary where the classification result of the classifier changes in the feature amount space;
    analyzing a distribution of the learning data in the feature amount space formed by the feature amount vector;
    generating first pseudo input data by using the feature amount vector existing in a vicinity of the boundary;
    generating the new learning data configured using the first pseudo input data and the first teacher data and to suppress the changes in the feature amount space of the new learning data to avoid outputting the classification result that is erroneous; and
    storing the new learning data in the memory; and
  generating and outputting display information for presenting an analysis result of the changes in the feature amount space of the classification result,
  specifying a region where the learning data is sparse on a basis of the analysis result of the distribution of the learning data in the feature amount space;
  generating second pseudo input data by using the feature amount vector included in the region; and
  generating new learning data configured using the second pseudo input data and the first teacher data of the learning data included in the region
  wherein the memory stores evaluation data configured using second input data and second teacher data, and
  wherein the learning method further comprises:
    calculating the feature amount vector by using the second input data of the evaluation data;
    analyzing the distribution of the evaluation data in the feature amount space on the basis of the feature amount vector of the evaluation data to specify a region where the evaluation data is sparse;
    generating second pseudo input data by using the feature amount vector included in the specified region;
    generating new evaluation data configured using the second pseudo input data and the second teacher data of the evaluation data included in the specified region, and stores the new evaluation data in the storage circuit; and
    evaluating the classifier by using the evaluation data stored in the memory,
  wherein the classifier is generated by machine learning via a neural network or support vector machine, and
  wherein the changes are suppressed in a classification surface in a region where the new learning data is dense to improve classification accuracy by re-learning for a sample that the classifier did not correctly classify before the re-learning.

6. The learning method according to claim 5, wherein the first pseudo input data is generated on the basis of the feature amount vector positioned in the vicinity of the representative learning data in the feature amount space.

7. The learning method according to claim 5, wherein the memory stores evaluation data configured using second input data and second teacher data, and
  wherein the learning method further comprises:
    generating, where the new learning data is stored in the memory after generating a first classifier, a second classifier by executing the learning processing again;
    comparing an output value obtained by inputting the second input data of the evaluation data to the first classifier and the second classifier with the second teacher data of the evaluation data to acquire corresponding classification results for the evaluation data of the first classifier and the second classifier;
    analyzing changes in the corresponding classification results for the evaluation data on the basis of the corresponding classification results for the evaluation data of the first classifier and the second classifier; and
    determining which one of the first classifier and the second classifier to employ as the classifier on the basis of the changes in the corresponding classification results.

8. An analysis system comprises:
  A computing machine having an arithmetic device, a storage device connected to the arithmetic device, and an interface connected to the arithmetic device, the computing machine efficiently and effectively generates and improve classification accuracy a classifier for classifying an arbitrary event to avoid outputting a classification result that is erroneous, the computing machine comprising:
    a storage unit that stores learning data configured using first input data and first teacher data;
    a learning circuit that executes a learning processing for generating the classifier by using the learning data stored in the storage circuit;
    a generation circuit that:
      generates the learning data,
      calculates a feature amount vector handled by the classifier by using the first input data, the feature amount vector forms a feature amount space and specifies a boundary where the classification result of the classifier changes in the feature amount space,
      analyzes a distribution of the learning data in the feature amount space formed by the feature amount vector,
      generates first pseudo input data by using the feature amount vector existing in a vicinity of the boundary,
      generates new learning data configured using the first pseudo input data and the first teacher data and to suppress the changes in the feature amount space of the new learning data to avoid outputting the classification result that is erroneous, and stores the new learning data in the storage circuit; and
    an output circuit that generates and outputs display information for presenting an analysis result of the changes in the feature amount space of the classification result,
  wherein the generation circuit specifies a region where the learning data is sparse on a basis of the distribution of the learning data in the feature amount space, generates second pseudo input data by using the feature amount vector included in the region, generates second new learning data configured using the second pseudo input data and the first teacher data of the learning data included in the region, and stores the second new learning data in the storage circuit,
  wherein the storage circuit stores evaluation data configured using second input data and second teacher data, wherein the computing machine includes an evaluation circuit that evaluates the classifier by using the evaluation data stored in the storage circuit, wherein the generation circuit calculates the feature amount vector by using the second input data of the evaluation data, analyzes a second distribution of the evaluation data in the feature amount space to specify a region where the evaluation data is sparse, generates second pseudo input data by using the feature amount vector included in the region, generates second new evaluation data configured using the second pseudo input data and the second teacher data of the evaluation data included in the region, and stores the second new evaluation data in the storage circuit, wherein the classifier is generated by machine learning via a neural network or support vector machine, and wherein the changes are suppressed in a classification surface in a region where the new learning data is dense to improve classification accuracy by re-learning for a sample that the classifier did not correctly classify before the re-learning, and an analysis device that performs analysis using the classifier.

* * * * *